United States Patent
Vaysman et al.

(10) Patent No.: US 11,709,539 B2
(45) Date of Patent: Jul. 25, 2023

(54) LOW POWER STATE STAGING

(71) Applicant: Western Digital Technologies, Inc., San Jose, CA (US)

(72) Inventors: Dmitry Vaysman, San Jose, CA (US); Eran Erez, Bothell, WA (US); Judah Gamliel Hahn, Ofra (IL); Sartaj Ajrawat, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 276 days.

(21) Appl. No.: 16/915,910

(22) Filed: Jun. 29, 2020

(65) Prior Publication Data

US 2020/0333870 A1 Oct. 22, 2020

Related U.S. Application Data

(63) Continuation-in-part of application No. PCT/US2018/060752, filed on Nov. 13, 2018.

(60) Provisional application No. 62/930,205, filed on Nov. 4, 2019.

(51) Int. Cl.
*G06F 1/32* (2019.01)
*G06F 1/3225* (2019.01)
*G06F 1/3234* (2019.01)

(52) U.S. Cl.
CPC .......... *G06F 1/3225* (2013.01); *G06F 1/3275* (2013.01)

(58) Field of Classification Search
CPC .............................. G06F 1/3275; G06F 1/3225
See application file for complete search history.

(56) References Cited

U.S. PATENT DOCUMENTS

| | | | |
|---|---|---|---|
| 9,260,066 B2 | 2/2016 | Tokunaga et al. | |
| 9,292,073 B2 | 3/2016 | Wang et al. | |
| 9,798,662 B2 | 10/2017 | Sauber et al. | |
| 9,916,876 B2 | 3/2018 | Partiwala et al. | |
| 2010/0023800 A1 | 1/2010 | Harari et al. | |
| 2010/0146187 A1 | 6/2010 | Grimsrud et al. | |
| 2011/0296088 A1 | 12/2011 | Duzly et al. | |
| 2012/0023351 A1 | 1/2012 | Wakrat et al. | |
| 2012/0124276 A1 | 5/2012 | Ahn et al. | |

(Continued)

FOREIGN PATENT DOCUMENTS

CN 104011800 A 8/2014

OTHER PUBLICATIONS

Preliminary Report on Patentability issued in corresponding International Application No. PCT/US2018/060752, dated Aug. 6, 2020 (10 pages).

(Continued)

*Primary Examiner* — Stefan Stoynov
(74) *Attorney, Agent, or Firm* — Patterson + Sheridan, LLP; Steven H. VerSteeg

(57) ABSTRACT

The present disclosure generally relates to split, non-operational power states for a data storage device. The data storage device can transition between the split, non-operational power states without advertising the transition to the host device. The power state parameters that are advertised to the host device are adjusted such that the host device is guided to the correct power decision based on the advertised power and duration. By splitting the non-operational power states, the data storage device does not incur additional transitional energy costs for short idle durations.

20 Claims, 8 Drawing Sheets

(56) References Cited

U.S. PATENT DOCUMENTS

| | | |
|---|---|---|
| 2015/0309750 A1 | 10/2015 | Chen et al. |
| 2015/0309752 A1 | 10/2015 | Ellis et al. |
| 2016/0041831 A1 | 2/2016 | Carmeli et al. |
| 2017/0060202 A1 | 3/2017 | Sundaram et al. |
| 2017/0242606 A1 | 8/2017 | Maiko et al. |
| 2019/0042444 A1 | 2/2019 | Natarajan et al. |
| 2019/0227725 A1 | 7/2019 | Afriat et al. |
| 2019/0303024 A1 | 10/2019 | Iwai et al. |
| 2020/0201417 A1* | 6/2020 | Park .................... G06F 1/3275 |

OTHER PUBLICATIONS

U.S. Appl. No. 15/913,581, filed Mar. 6, 2018.
International Search Report issued in corresponding International Application No. PCT/US2018/060752, dated Feb. 27, 2019 (6 pages).
Written Opinion issued in corresponding International Application No. PCT/US2018/060752, dated Feb. 27, 2019 (8 pages).

\* cited by examiner

LOW POWER STATE STAGING

CROSS-REFERENCE TO RELATED APPLICATION

The present application is a continuation-in-part of International Application No. PCT/US2018/060752 filed Nov. 13, 2018, which application claims priority to U.S. patent application Ser. No. 15/878,735, filed Jan. 24, 2018, which are incorporated by reference herein in its entirety. The present application also claims priority to U.S. Provisional Patent Application No. 62/930,205 filed Nov. 4, 2019, which is incorporated by reference herein in its entirety.

FIELD OF DISCLOSURE

Aspects of the disclosure relate to power states and power usage of host connected devices. More specifically, aspects of the disclosure relate to methods for selective advertisement of power states in storage devices. Embodiments of the present disclosure generally relate to split, non-operational power states for a data storage device.

BACKGROUND INFORMATION

Field

Consumer storage devices, such as memory arrangements for computers, may have a number of power states. These power states are individually defined and are created to reduce overall power usage. In certain instances, there may be a trade-off between different power parameters and the time and energy required to enter and exit these power states. A device may advertise multiple power usage states with different operational parameters.

In one example, the NVM Express protocol used by a high-performance consumer storage device includes up to thirty two power states, each of which is advertised by the device as part of the response to a host-submitted Identify Controller command. Each of the individual power states include parameters such as the entry latency, exit latency, and target power consumption while the state is active. Entry latency, for example, is measured as the time taken from the completion of the command which puts the device into a specific power state until power consumption does not exceed the target. Exit latency is measured as the time from when the device leaves the power state (either due to a host power management directive or due to an I/O command) until the device is operational again and can complete an input/output command successfully without additional latency.

Non-volatile memory consumer devices typically have two non-operational power states, as well as three operational states. The non-operational states are referred to herein as PS3 and PS4, although an implementation may have different power states and may number these states in a different manner.

PS3 is defined as a non-operational state with a short entry and exit latency, while the PS4 state sacrifices latency for greater power reduction. For example, the PS3 state may have an entry and exit latency measured in the single-millisecond range, while consuming 50-100 mW of power, while the PS4 state may have an entry and exit latency measured in the tens of milliseconds but may consume only 1-5 mW of power. In both cases, the device will consume much more power during the transition period, as the device records state information.

Non-volatile memory storage devices may support multiple power management command methods. For example, in devices using the NVM Express protocol, the host may send a "Set Features/Power Management" command to the device with the requested power state in order to initiate transition to a new state. After the command completes successfully, the device transitions to the new power state within the time advertised in the entry latency parameter of the power state table returned in the "Identify Controller" data structure. In a host directed device initiated method (Autonomous Power State Transitions), the host sends a list of power states that the device should transition into, based on idle time. When the device detects that no commands have been sent from the host for the specified duration, it will transition into a given non-operational power state autonomously. In both cases, the device will transition back to the last operational power state immediately upon receipt of an input/output command. The host may take the entry and/or exit latency into account in selecting eligible power states as well as in specifying the idle time required prior to transitioning into this power state.

Each transition has a certain cost in terms of power (transitional energy). Writing state data to the device may also impact endurance, since each transition may require control writes and padding for open blocks. In a worst-case environment, immediate power state transitions following very small writes may drastically increase write amplification.

There is a need to provide a method for minimizing the power state transition costs for devices that may be connected to a host.

There is a further need to provide a method and apparatus to allow the most efficient use of power states for a connected device.

There is a still further need to provide a method and apparatus to detect commands from a host device and allow a connected device sufficient autonomy to minimize not only power costs but also latency and operational command requests.

Additionally, memory devices typically inform a host device, or advertise to a host device, two non-operational power states. The first non-operational power state is a low-latency power state with relatively high power consumption (i.e., tens of milliwatts). The second non-operational power state has a lower power consumption than the first non-operational power state (i.e., about five milliwatts or less), but has a longer latency to exit the second non-operational power state as compared to the first non-operational power state.

Switching to the second non-operational power state during idle times depends on the latency that would occur to resume normal operations. During the second non-operational power state, most of the memory subsystems are shut-off or disabled. Volatile memory, such as SRAM, is a major consumer of power and has substantial leakage when maintained in a retention mode. In order to minimize the power consumption, data is typically flushed from the volatile memory to non-volatile memory such as NAND so that the volatile memory can be completely powered down.

The latency time necessary to restore all system parameters and resume normal operations is relatively short. Therefore, switching to the second non-operational power state can occur as often as every 100 ms or more. However, flushing data from the volatile memory to the non-volatile memory requires a program erase cycle and block budget allocation that might reflect in increased cost or inflated requirements for the non-volatile memory die. Additionally, energy spend to flush the volatile memory data and later reload the data again for a short duration is significantly high to make the whole process inefficient.

Therefore, there is a need in the art for more efficient non-operational power management.

SUMMARY

So that the manner in which the above recited features of the present disclosure can be understood in detail, a more particular description of the disclosure, briefly summarized below, may be had by reference to embodiments, some of which are illustrated in the appended drawings. It is to be noted that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a device for storing data is disclosed comprising a storage arrangement configured to store and retrieve data, at least one endurance counter configured to monitor operations of the storage arrangement and compare operations to a threshold, a host interface configured to send and receive data from and to a host, a flash translation layer, a storage interface configured to send and receive data to the storage arrangement, a power state modifier configuration connected to the identify controller and a power manager configured to supply power to the storage arrangement, the host interface, the flash translation layer, the identify controller and the storage interface, wherein the identify controller is configured to have a table of power states for the storage arrangement, the host interface, the flash translation layer, the storage interface and the power state modifier is configured to update the table of power states dynamically and wherein the power manager is configured to read the table of power states and deliver power to the storage arrangement, the host interface, the flash translation layer, the identify controller and the storage interface according to the table.

In another non-limiting embodiment, a method of operation for a storage device is disclosed comprising: entering a maintenance cycle with the storage device; retrieving endurance data for at least one parameter of the storage device; comparing the endurance data for the at least one parameter of the storage device to a rated value, determining when the endurance data for the at least one parameter of the storage device exceeds the rated value and modify a lowest power state of the storage device.

In another non-limiting embodiment, an arrangement is disclosed comprising means for entering a maintenance cycle with the storage device, means for retrieving endurance data for at least one parameter of the storage device, means for comparing the endurance data for the at least one parameter of the storage device to a rated value, means for determining when the endurance data for the at least one parameter of the storage device exceeds the rated value and means for modify a lowest power state of the storage device.

The present disclosure generally relates to split, non-operational power states for a data storage device. The data storage device can transition between the split, non-operational power states without advertising the transition to the host device. The power state parameters that are advertised to the host device are adjusted such that the host device is guided to the correct power decision based on the advertised power and duration. By splitting the non-operational power states, the data storage device does not incur additional transitional energy costs for short idle durations.

In one embodiment, a data storage device comprises: at least one non-volatile memory device; at least one volatile memory device; a timer; and a controller coupled to the timer, the at least one non-volatile memory device, and the at least one volatile memory device. The controller is configured to: receive a request from a host device to enter into the lowest power state advertised to the host device; after a predetermined period of time, flush data from the at least one volatile memory device to the at least one non-volatile memory device, wherein the predetermined period of time is greater than 0.1 seconds; and cause the data storage device to enter the lowest power state advertised to the host device.

In another embodiment, a data storage device comprises: at least one non-volatile memory device; and a controller coupled to the at least one non-volatile memory device, the controller configured to: present a power state descriptor table; and dynamically change the power state description table.

In another embodiment, a data storage device comprises: at least one non-volatile memory device; means to extend latency advertised to a host device; and means to perform a transition to a lower internal state after a predetermined period of time.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
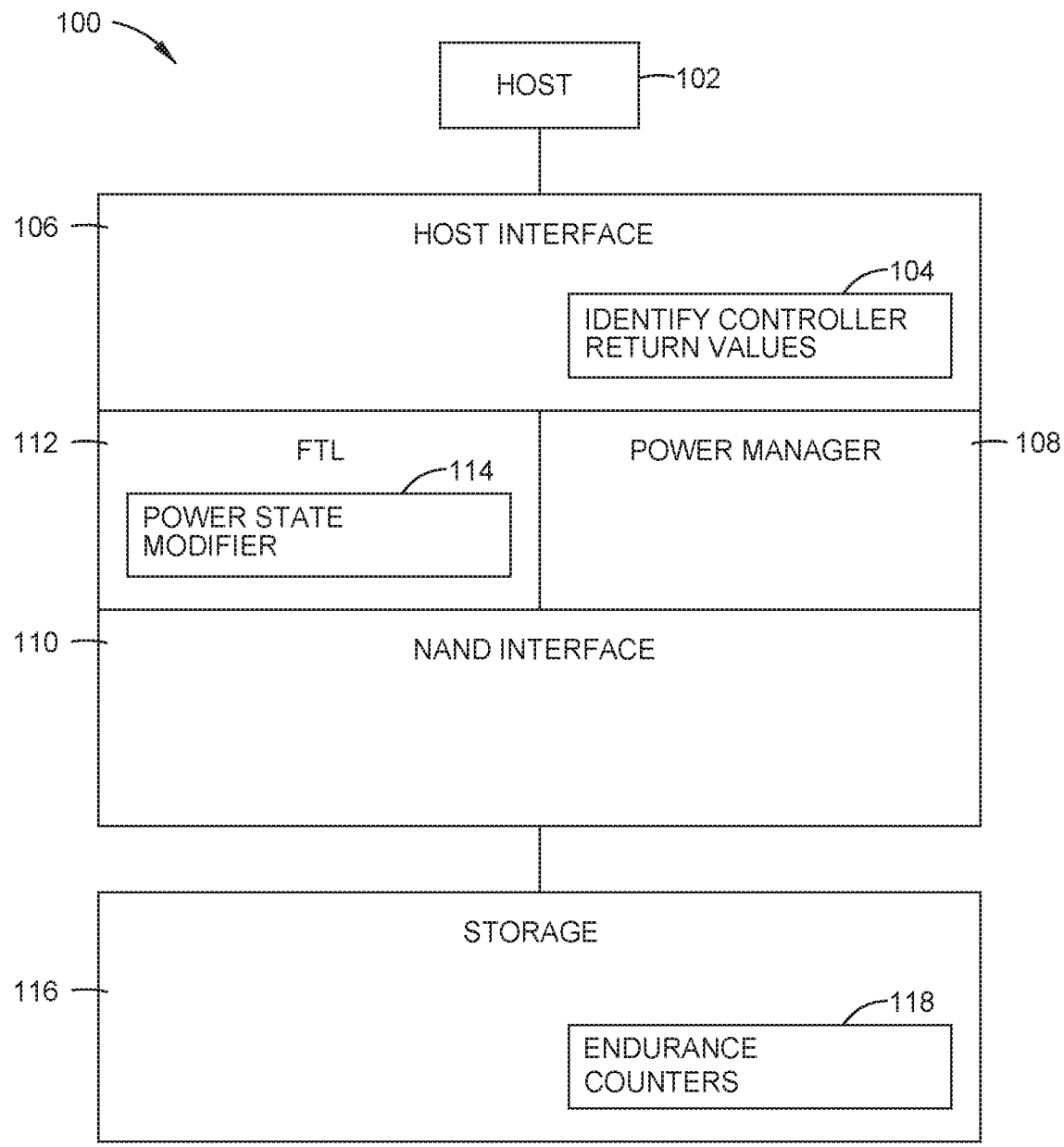
FIG. 1 is a diagram of a host and host-connected device, in one example embodiment of the description.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of any inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

The aspects of the description apply to computers and more specifically, aspects of controlling computers or computer connected devices such that the devices perform in an optimal method of operation. The aspects described relate to a host that interacts with other devices, such as a data storage arrangement. Data storage arrangements may be, for example, disk drives, hybrid disk drive, NAND flash units and other similar arrangements. In the illustrated embodiments described, NAND flash units are described.

In the embodiments described, a data storage arrangement is connected to a host system through an interface. The host system, in the illustrated embodiments, is a personal computer or a server so the personal computer or server may transmit and receive data from a data storage arrangement. The function of the data storage arrangement is to accept and store data until the data is needed by a user or the host. The data storage arrangement may have to accept large bursts of data at a rapid pace, depending on the computer processes performed, therefore the data storage arrangement is configured with multiple memory units, formed into arrays, that provide for various states of usage. Dies may write data to the arrays, as necessary, to complete the memory storage functions.

Certain sections of the data storage arrangement may be configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. A NAND data storage arrangement with specific arrays may be configured from single level or multi-level cell arrangements. The data storage arrangement may have an interface that allows the data storage arrangement to connect with the host and allow for synchronization of the host and the data storage arrangement. The interface may be a NVM Express (NVMe) compatible interface, as a non-limiting embodiment. The memory storage may have a configuration to allow for plug and play ability. Although described as having a NVMe compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection.

Auxiliary connections may be provided to the data storage arrangement to allow for additional options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard-wired configurations. Gigabit Ethernet interfaces and connections may also be used. The throttling capabilities of the memory arrangement, therefore, may be used in capacities where writing of data to a NAND arrangement, secure digital card or other memory arrangement is necessary.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, and stereo audio systems. The internal software may also be provided such that the access of data may be performed by cloud applications designed for interface with the data storage arrangement.

The internal software of the data storage arrangement may be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

A controller is provided to control actions of the data storage arrangement as required by the host. The controller may also be configured to perform maintenance activities for the data storage arrangement to allow for efficient use. The controller may be provided with code that interfaces with the internal software of the data storage arrangement to allow the controller to perform the various functions required. The controller, for example, may interact with the dies of the data storage device to allow for reading or writing of data to the data storage device.

Referring to FIG. 1, an arrangement 100 is illustrated. A host 102 is connected through a host interface 106 to a storage arrangement 116. The storage 116 arrangement may be, for example, a solid state drive that is configured to send and receive data. The storage arrangement 116 may be comprised of NAND flash units which may be of single level cell construction for minimum latency characteristics. In other embodiments, the NAND flash units may be multi-level cell constructions if reduced cost for the storage 116 is required or if a greater amount of storage 116 is needed.

The data that is sent to the storage 116 from the host 102 passes to a host interface 106 that has an controller that may identify return values 104. The host interface 106 allows for communication between components downstream of the interface with the host 102. In one embodiment, elements 106 to 110 may be grouped together as a storage controller. A power manager 108 is also connected to the host interface 106 and a NAND interface 110 as well as a flash translation layer (FTL) 112. The FTL 112 is used to translate the logical block addresses into physical locations in storage. File system translation occurs in the host 102. The FTL 112 may be programmed, therefore, to account for expected lifecycles of the NAND, energy consumption and performance of the NAND in the storage 116.

A power state modifier 114 is also present to modify power states of the storage 116 and/or other components through action of the power manager 108. The power state modifier 114 can modify the power delivered to the different systems through updating of the power state tables in the identify controller return values 104. In one non-limiting embodiment, five (5) different power states can be chosen. Although described as having five (5) different power states, other numbers of power states may be used.

In other non-limiting embodiments, endurance counters 118 may be provided such that a number of cycles of certain actions of the storage device are monitored and counted. The actions, such as a number of read operations, a number of write operations, may be counted and are further described below. For the purposes of definition, the storage 116, endurance counters 118, NAND interface 110, power manager 108, FTL 112, power state modifier 114, host interface 106 and identify controller return values 104 may be one arrangement, or "device" that may be housed in a single unit. Other arrangements of the device may include less or more components described.

Endurance counters 118 are an example of an apparatus used to manage device endurance. In one non-limiting embodiment, the counters 118 may track program/erase frequencies for NAND storage 116. The storage 116 may also use statistical methods or bit error rate (BER) tracking in place of or in addition to the endurance counters. In specific cases, a device 116 may track media wear-out either for specific blocks or for the entire device 116. When media wear-out exceeds a pre-defined threshold, the device 116 will notify the host 102 that the device 116 has exceeded a useful life and should be replaced to prevent data loss. The storage 116 may also track power on hours and host write data, and is rated to last a certain number of years of use and/or a certain amount of host write data. In instances where the number of hours/years of operation exceed manufacturer limits, a warning may be generated to a user or system manager.

Aspects described also provide for a dynamically updated power state table. In conventional applications, a power state table is generally treated as a static set of entries. Significant advantages, however, are present when a power state table is dynamically updated. In certain circumstances, the device may change advertised power states at any time, although the host 102 will typically only consult the power state table during device initialization and may not note the new states until the next reset. The device may alter parameters in order to manipulate host decisions on which power state to use.

Figure 2:
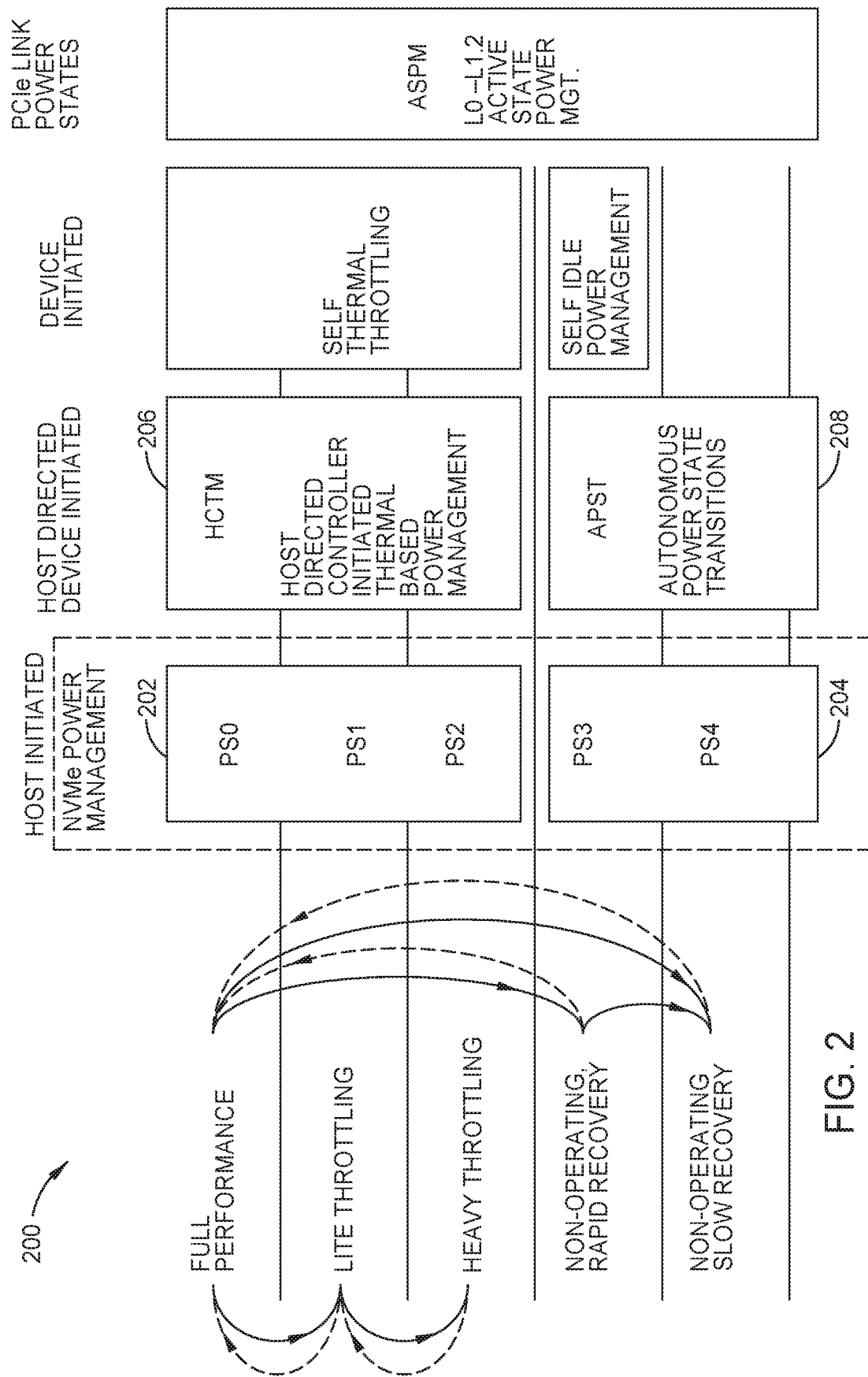
FIG. 2 is a graph of power states of a host-connected device in another example embodiment of the description.

As recited above, five (5) power states may be used, as a non-limiting embodiment. Referring to FIG. 2, different power states 200 may be used according to different host initiated schemes, host directed device initiated schemes, device initiated or PCIe link power states. In a non-limiting embodiment for a host initiated method, five different power states PS0, PS1, PS2, PS3 and PS4 are illustrated. Power states PS3 and PS4 204 relate to non-operating rapid recovery (PS3) and non-operating slow recover (PS4). Power state PS2 relates to heavy throttling, PS1 relates to lite throttling and PS0 relates to full performance. The lowest power rating of the described power states is PS4. In the illustrated embodiment, power may be reduced from a full performance PS0 to PS4 value (non-operating slow recovery) or PS3 (non-operating rapid recovery). Power stage changes can also occur between PS0 (full performance) to PS1 (lite throttling) in both increasing and decreasing power states. Power may also be increased or decreased between PS1 (lite throttling) and PS2 (heavy throttling) power states.

Still referring to FIG. 2, for host directed and device initiated schemes ($2^{nd}$ from left), the host 102 may have a controller that directs operations based upon thermal based power management 206. To aid in the thermal based power management, thermocouples or other temperature sensors may be strategically located throughout the device for actual temperature measurement or a data table may be used for anticipated thermal values based upon operations. Factors such as ambient temperature, humidity, length of operation may also be accounted for within these values. For low power states for host directed and device initiated schemes, autonomous power state transitions (APST) 208 may be used to for control.

In one example embodiment, a host driver may have a maximum entry/exit latency threshold, above which a specific power state will not be selected. As such, the device may raise this threshold if frequent power state transitions have accelerated device wear-out, thus extending the device life at the cost of additional power consumption. In another non-limiting embodiment, the device may change the target power consumption advertised for a specific power state, thus raising the allowed power budget and reducing the need to perform additional control writes in that state. In other embodiments, drivers may utilize host directed or device initiated power state transition methods, as necessary. One power state may be selected based on entry and exit latency, in the case of a host directed power management action. The idle time prior to transition is determined by the host 102 and may not factor in device-side latencies.

In device initiated power management actions, two power states may be selected. Idle time prior to transition may be specified based on device-advertised exit latencies.

In another example embodiment, the device may hide a power state entirely from the host 102 after a certain threshold has been reached. By hiding the power state of the device from the host 102, the device can extend a useful life of the device at the expense of optimal power consumption. As will be understood, the device may hide any power state that the device is programmed to enter.

The identify controller return values 104 are typically managed as a static table which is returned to the host 102 on demand. This table for the identify controller return values 104 may be drawn from values stored in the non-volatile storage 116 (typically as part of an internal management file system managed by device firmware). In aspects described, the power state modifier 114 can change these values 104, specifically the power state table. When reference is then made to the table for what power state to enter, the dynamically modified table allows the device to enter the best available power state for the device.

In differing embodiments, another threshold may be added, which marks a point at which the device is wearing out faster than rated. When the newly added threshold is reached, corrective action may be taken in the form of modifying the power state table. For example, if the device exceeded 50% of its useful life in less than 40% of the rated time or host write volume, the power state table may be modified.

Figure 3:
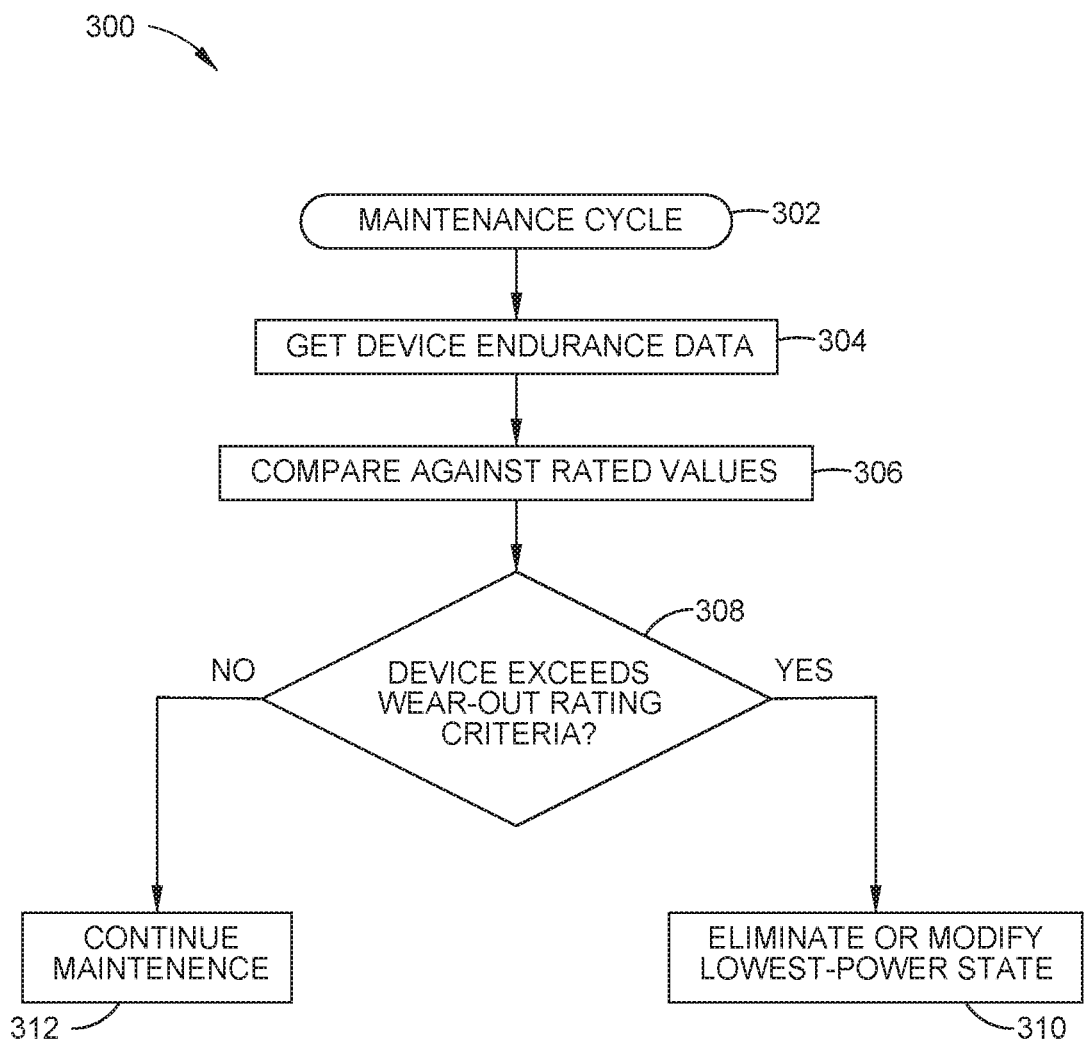
FIG. 3 is a flow chart for maintenance cycle operations in another example embodiment of the description.

Referring to FIG. 3, a flow chart for a method 300 of reviewing a maintenance cycle for a storage device is illustrated. A storage device contemplated for review may be, for example, a combination of the host interface 106, identify controller return values 104, power state modifier 114, flash translation modifier 114, power manager 108, NAND interface, storage 116, endurance counters 118 and associated controllers for the components described. At 302 a maintenance cycle may be entered by the device. Device endurance data may be obtained at 304 wherein actual values from the endurance counters 118 are obtained. At 306, the values obtained at 304 are compared to rated values for the components of the device. The rated values may be stored in the storage 116 and recovered for use at 306. At 308, a query is performed to determine if the device exceeds a wear-out rating criteria. If the device does not exceed the wear-out rating criteria, maintenance may be continued at 312. If the device does exceed the wear out rating criteria at 308, a power state may be eliminated or modified at 310 to ensure that the wear out rating is not exceeded in future iterations. As stated previously, any power state may be eliminated according to the wear out criteria.

In one embodiment, the lowest power state has the potential of increasing write amplification since when entering this power state the device is required to write all state data and close open blocks. When the device is wearing out too quickly, indicating that the host 102 triggers entry into this power state more rapidly than expected, the device may take a corrective action by eliminating the lowest power state from the advertised list of power states. The table in the identify controller return values 104 may be dynamically modified such that the lowest power state is eliminated. In other disclosed embodiments, a warning may be provided to a user that a threshold value has been exceeded. The warning may be a visual warning to the user that a number of write cycles, for example, has been exceeded by the storage device and that it is recommended to change the storage device.

In another disclosed embodiment, the device may modify a power state by increasing a rated power, and thus permit an altered action by the device. For example, devices with DDR memory to store state information consume ~15 mW while the DDR is in self-refresh mode and most of the rest of the device is powered down. Such a device may turn off DDR in order to save about 10 mW of power, but this requires writing state information to NAND. Once a media wear out threshold has been reached, the device may update a power state table to advertise that the target power is 15 mW and leave DDR operational, thus reducing write overhead.

In another embodiment of a described aspect, the device may change entry and/or exit latencies in order to influence the host power policy. By extending the latencies, a host 102 which uses these values as inputs into the amount of idle time required prior to transitioning to a specific power state may delay entry into the power state or ignore it entirely.

In another embodiment, when the device changes a power state, the host 102 is not immediately aware of the change in power state since these values are recorded in the identify controller data structure, which is not consulted after device initialization. In order to refresh the values, the device may trigger a failure state or a timeout, forcing the host 102 to reset the device and re-read the new values.

In one non-limiting embodiment, a device for storing data is disclosed comprising a storage arrangement configured to store and retrieve data, at least one endurance counter configured to monitor operations of the storage arrangement and compare operations to a threshold, a host interface configured to send and receive data from and to a host, a flash translation layer, an identify controller, a storage interface configured to send and receive data to the storage arrangement, a power state modifier configuration connected to the identify controller and a power manager configured to supply power to the storage arrangement, the host interface, the flash translation layer, the identify controller and the storage interface, wherein the identify controller is configured to have a table of power states for the storage arrangement, the host interface, the flash translation layer, the storage interface and the power state modifier is configured to update the table of power states dynamically and wherein the power manager is configured to read the table of power states and deliver power to the storage arrangement, the host interface, the flash translation layer, the identify controller and the storage interface according to the table.

In another non-limiting embodiment, the device may be configured wherein the interface to the storage arrangement is a NAND interface.

In another non-limiting embodiment, the device may further comprise at least one endurance counter configured to monitor at least one operation of the storage arrangement and compare operations to a threshold.

In another non-limiting embodiment, the device may be configured wherein the at least one operation is a write operation.

In another non-limiting embodiment, the device may be configured, wherein the at least one operation is a read operation.

In another non-limiting embodiment, the device may further comprise at least one temperature sensor measuring temperature in at least one of the storage arrangement, the power manager, the flash translation layer the storage interface and the host interface.

In another non-limiting embodiment, the device may be configured wherein the host interface is one of a PCI Express, USB, Firewire and Bluetooth interface.

In another non-limiting embodiment, a method of operation for a storage device is disclosed comprising: entering a maintenance cycle with the storage device; retrieving endurance data for at least one parameter of the storage device; comparing the endurance data for the at least one parameter of the storage device to a rated value, determining when the endurance data for the at least one parameter of the storage device exceeds the rated value and modify a lowest power state of the storage device.

In another non-limiting embodiment the method may further comprise continuing a maintenance cycle for the storage device when the endurance data for the at least one parameter of the storage device does not exceed the rated value.

In another non-limiting embodiment, the method may be performed wherein the at least one parameter of the storage device is a write cycle.

In another non-limiting embodiment, the method may be performed wherein the at least one parameter of the storage device is a read cycle.

In another non-limiting embodiment, the method may be performed wherein the at least one parameter is a temperature limitation.

In another non-limiting embodiment, the method may be performed wherein the retrieving the endurance data for the at least one parameter of the storage device is from the storage device.

In another non-limiting embodiment, the method may be performed wherein the storage device is a solid state drive.

In another non-limiting embodiment, the method may further comprise providing a warning to the host that the rated value has been exceeded.

In another non-limiting embodiment, the method may be performed wherein the warning is a visual warning.

In another non-limiting embodiment, the method may be performed wherein the lowest power state of the storage device is based on a self-idle power management scheme.

In another non-limiting embodiment, the method may be performed wherein the lowest power state of the storage device is based on a non-volatile memory power management scheme.

In another non-limiting embodiment, the method may be performed wherein the lowest power state of the storage device is based on autonomous power state transitions.

In another non-limiting embodiment, the method may be performed wherein the non-volatile memory power management scheme is a host initiated scheme.

In another non-limiting embodiment, the method may be performed wherein the autonomous power state transition is a host directed device initiated scheme.

In another non-limiting embodiment, the method may be performed wherein the self-idle power management scheme is a device initiated scheme.

In another non-limiting embodiment, the method may be performed wherein the lowest power state of the storage device is based on an active state power management.

In another non-limiting embodiment, the method may be performed wherein the lowest power state is defined by a PCIe link power state.

In another non-limiting embodiment, an arrangement is disclosed comprising means for entering a maintenance cycle with the storage device, means for retrieving endurance data for at least one parameter of the storage device, means for comparing the endurance data for the at least one parameter of the storage device to a rated value, means for determining when the endurance data for the at least one parameter of the storage device exceeds the rated value and means for modify a lowest power state of the storage device.

In another example embodiment, the arrangement may further comprise means for providing a warning to a user that the rated value has been exceeded.

The present disclosure generally relates to split, non-operational power states for a data storage device. The data storage device can transition between the split, non-operational power states without advertising the transition to the host device. By advertising it is understood to mean providing the information to the host device by the data storage device. The power state parameters that are advertised to the host device are adjusted such that the host device is guided to the correct power decision based on the advertised power and duration. By splitting the non-operational power states, the data storage device does not incur additional transitional energy costs for short idle durations.

Figure 4:
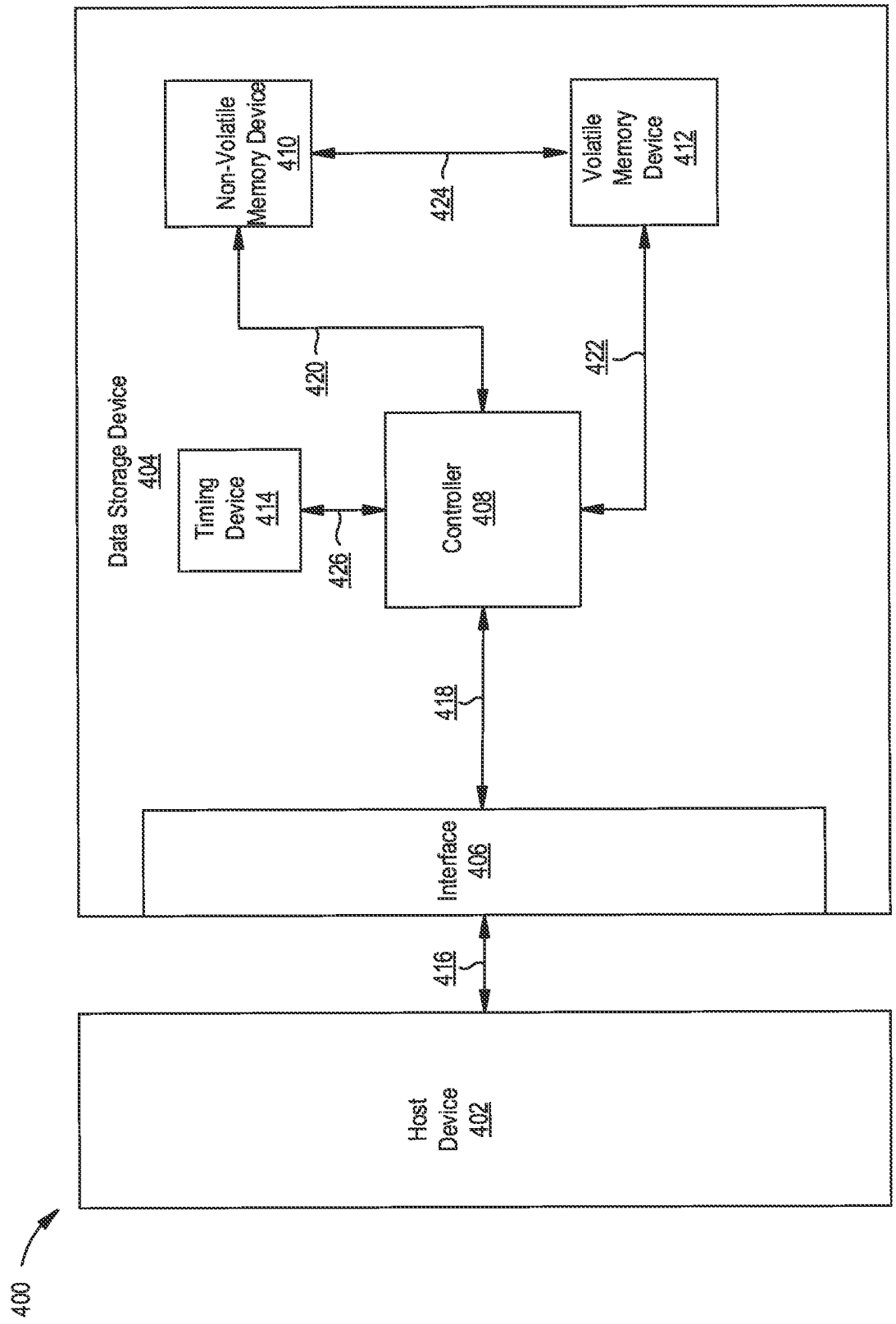
FIG. 4 is a schematic illustration of a system including a host device and a data storage device according to one embodiment.

FIG. 4 is a schematic illustration of a system 400 including a host device 402 and a data storage device 404 according to one embodiment. The host device 402 is coupled to the data storage device 404 through an interface 406. Data is sent between the host device 402 and the data storage device 404 as shown by arrow 416. The data storage device 404 includes a controller 408. The controller receives and sends data through the interface 406 as shown by arrow 418. At least one non-volatile memory device 410 is coupled to the controller 408 as shown by arrow 420. In one embodiment, the at least one non-volatile memory device 410 comprises NAND.

At least one volatile memory device 412 is also coupled to the controller as shown by arrow 422. In one embodiment, the at least one volatile memory device comprises SRAM. The controller 408 can flush data from the at least one volatile memory device 412 to the at least one non-volatile memory device 410, and vice versa, as shown by arrow 424. A timing device 414 is also coupled to the controller 408 as shown by arrow 426.

Currently, data storage devices minimize entry and exit latency as well as power consumption when in the lowest non-operational power state (i.e., the second non-operational power state) by shutting off all unnecessary sub-systems with a goal of running less than 5 mW of power while having an exit latency of less than 50 ms. When the goal has been satisfied, the host device is more likely to select the second non-operational power state as the low power option.

Figure 5:
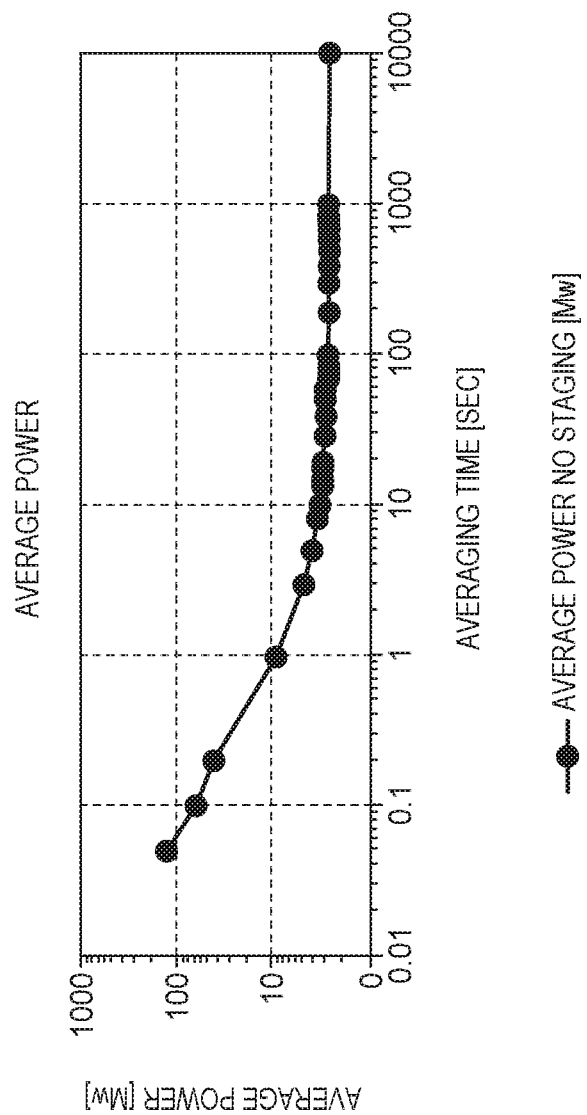
FIG. 5 is a graph illustrating the average power consumption over time according to one embodiment.

When operating in the second non-operational power state, there is a transitional energy of flushing data from volatile memory to non-volatile memory, which means that the overall device power consumption is actually higher when the host device elects to use the second non-operational power state for certain durations. FIG. 5 is a graph illustrating the average power consumption over time according to one embodiment. The average power consumption over time is the average power consumption for the second non-operational power state. As shown in FIG. 5, the average power consumption for the first 10 seconds is much higher than for the remainder of the time. Hence, the overall device power consumption is higher when the host elects to use the second non-operational power state for less than 10 seconds.

Figure 6:
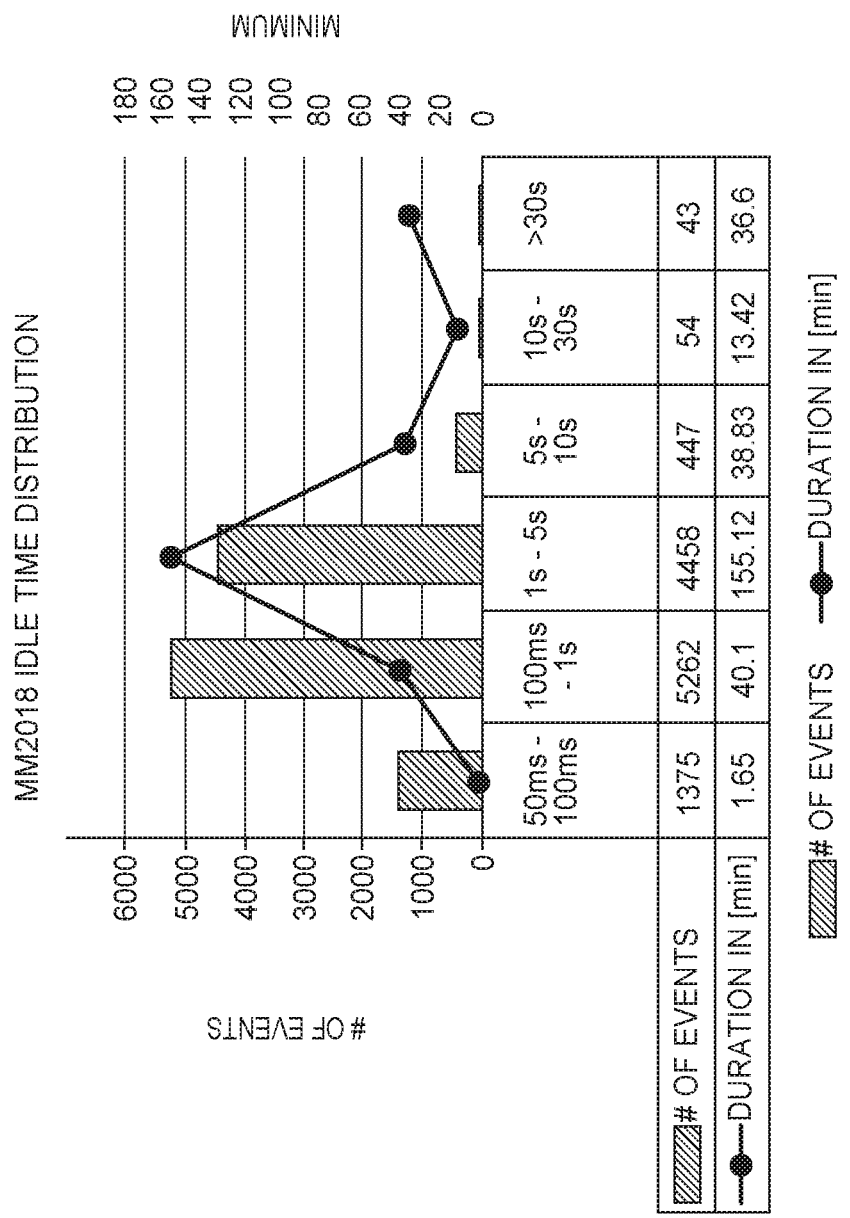
FIG. 6 is a graph illustrating idle time distribution according to one embodiment.

Coincidentally, most of the idle durations that would trigger the host device to choose the second non-operational power state are also less than 10 seconds. FIG. 6 is a graph illustrating idle time distribution according to one embodiment. As can be seen from FIG. 6, there are thousands of short duration idle times. Those thousands of short duration idle times would necessitate a substantially larger non-volatile memory budget for flushing data from volatile memory to non-volatile memory. Furthermore, while there would be a power consumption benefit of shifting to the second operational power state as shown by FIG. 5, the benefit is less than expected.

A better solution is to utilize a split power state where the device transitions internally from one state to another without advertising the transition to the host device. The power state parameters that are advertised to the host device are adjusted such that the host device is guided to the correct power decision based on the advertised power and duration. The data storage device does not incur additional transitional energy costs for short idle durations under such a scenario.

In Windows and Linux based host devices operating under NVMe, the host devices read a power state description table that is provided by the data storage device. The host device then selects two candidate power states based on the advertised entry/exit latencies, idle power, and maximum power advertised for each power state. NVMe defines a feature called permissive mode that permits the data storage device to temporarily exceed the advertised power limit to perform certain autonomous activities. The permissive mode is optional and may be disabled by the host device.

The split power state is implemented by defining an additional intermediate device power state that will be hidden from the host device. The intermediate state covers the initial duration of time when the volatile memory flush to non-volatile memory is not efficient from a power perspective as well as from the non-volatile memory block budget perspective. In this transitional state, the volatile memory remains in retention while consuming little more power but in average benefiting from the lower power consumption as well as the lower non-volatile memory block budget requirement.

To stage the transitional state, a timer is used to count the time that the data storage device resides in the initial sub-state. Once the timer times out, the data storage device would wake-up the backend sub-systems while keeping the front end in the second non-operational power state. The woken-up backend will flush the volatile memory content to the non-volatile memory and proceed into the full second non-operational power state with the lowest power consumption possible.

The transitional timeout is dynamic in one embodiment as a function of the non-volatile memory device state. For example, as the non-volatile memory device ages and the non-volatile memory device endurance is consumed, the number of flush events and frequency thereof may be reduced by increasing the timeout to thus extend the life of the non-volatile memory. In other situations, the timeout may be decreased if the non-volatile memory device detects that the hose is attributed by mostly long idle durations.

It is to be understood that the embodiments discussed herein are applicable to other power management systems including PCIe, NVMe, among others. The advertised latencies can be longer, and permissive mode is not relevant.

Figure 7:
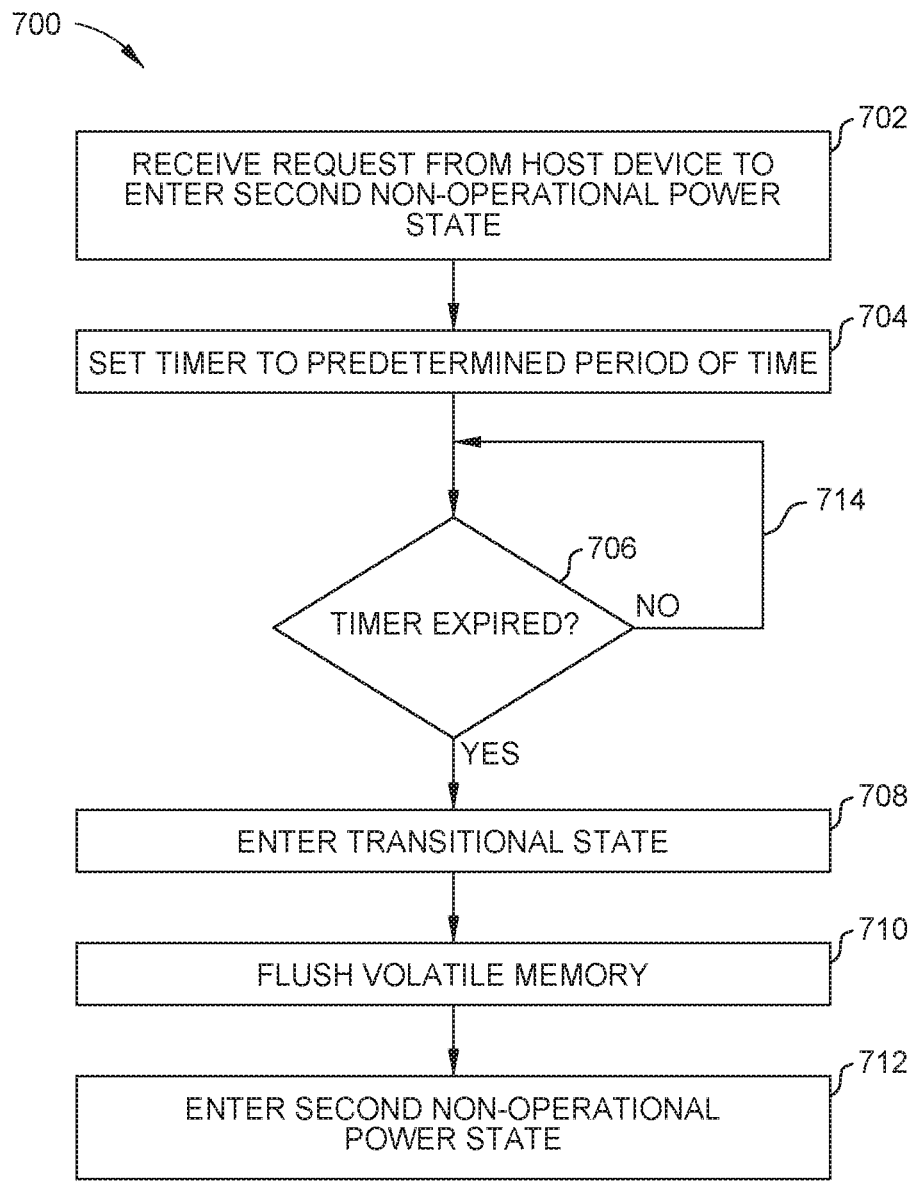
FIG. 7 is flowchart illustrating transitioning between two non-advertised power states according to one embodiment.

FIG. 7 is flowchart 700 illustrating transitioning between two non-advertised power states according to one embodiment. As shown in FIG. 7, the data storage device initially receives a request from the host device to enter the second non-operational state at item 702. The controller then sets the timer to the predetermined period of time at item 704. In one embodiment, the predetermined period of time is greater than 0.1 seconds, such as greater than 1 second, such as between about 1 second and about 10 seconds. The timer, now set, begins to run for the predetermined period of time. If the predetermined period of time has not completed as determined at item 706, then the timer continues to run and the timer is continually checked as shown by arrow 714. If however, the predetermined period of time has expired as determined at item 706, then data storage device enters a transitional state at item 708. The data is then flushed from the volatile memory device to the non-volatile memory device at item 710. Finally, the data storage device enters the second non-operational power state at item 712.

It should be noted that while waiting for the timer to reach the predetermined period of time, the host device may reach out to the data storage device and request the data storage device to exit the second non-operational power state (note that the host device at this time believes the data storage device is in the second non-operational power state). It should also be noted that while the data storage device is waiting for the timer to reach the predetermined period of time, other elements of the data storage device, namely backend elements of the data storage device, are powered down. Therefore, there is a power savings occurring due to the shutdown of backend elements. The power savings is not as much as occurs when the volatile memory has been shutdown in the second non-operational power state, but there is a power savings as well as non-volatile memory endurance savings as the volatile memory is not flushed to the non-volatile memory, and hence, avoiding at least one program-erase cycle.

In other words, by entering there is always a power savings and a non-volatile memory device endurance savings for every scenario the host device would request the data storage device to exit the second non-operational power state prior to the predetermined period of time. The only scenario where there is more power utilized than expected by the host device is when the host device would not request the data storage device to exit the second non-operational state until after the predetermined period of time. In that one scenario, there would be more power used than expected (i.e., to power the volatile memory for the predetermined period of time and any power needed to wake-up the backend for to flush the volatile memory), but no impact upon the non-volatile memory device endurance. As the host device is much more likely to request the data storage device to exit the second non-operational state prior to the predetermined period of time, as evidenced by FIGS. 5 and 6, the rare scenario of using more power should be more than offset by the power savings and the non-volatile memory device endurance improvement.

As noted above, transitioning between the power states incurs transitional energy, which can exceed the advertised power limit. If the host device enables permissive mode, or does not explicitly disable it, then the activity can be completely hidden from the power state descriptor and does not need to be shared with the host device. If the host disables permissive mode, then the data storage device is required to strictly adhere to the advertised power limit.

In one embodiment, the data storage device will dynamically change the power state descriptor table presented to the host device and increase the maximum power to reflect the transitional energy, while keeping the idle power the same.

In another embodiment, the data storage device will extend the advertised entry latency when permissive mode is disabled and perform the transition to a lower internal state after a predetermined period of time. For example, the data storage device may add 100 ms to about 400 ms to the advertised entry latency, which will allow delaying the split transition by the same amount of time. Host systems generally target a power state with a combined entry/exit latency of less than 500 ms as the lowest permissible power state.

The split power state introduces a power savings as well as non-volatile memory endurance savings. The expected power savings is about 10 percent to about 15 percent while the endurance savings is greater than 95 percent as only several percent of the idle durations are greater than 10 second intervals, thus keeping a reasonable balance between endurance and power consumption.

Figure 8:
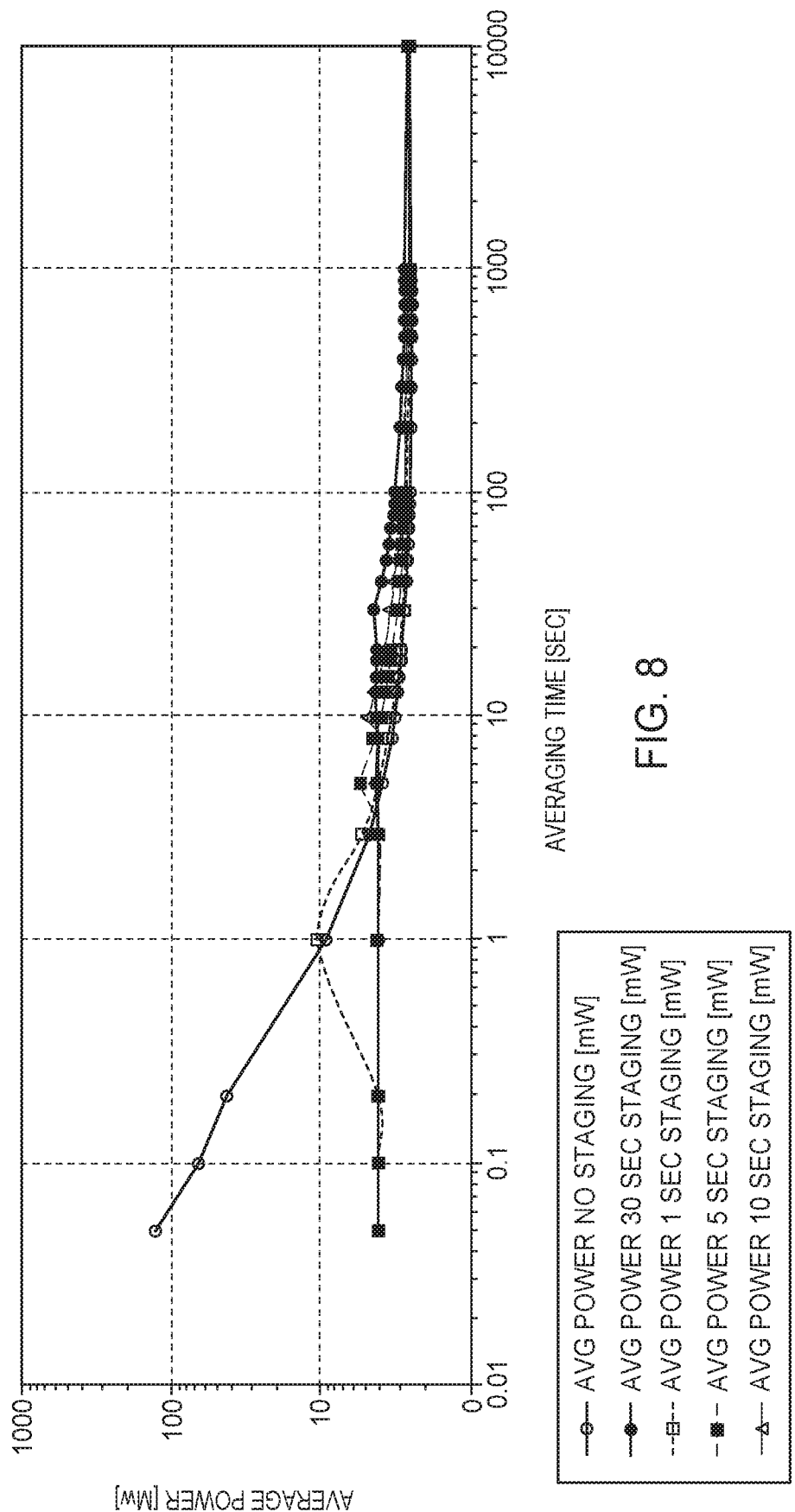
FIG. 8 is a graph illustrating the power benefit of waiting a predetermined period of time to flush data from a volatile memory device to a non-volatile memory device according to one embodiment.

FIG. 8 is a graph illustrating the power benefit of waiting a predetermined period of time to flush data from a volatile memory device to a non-volatile memory device according to one embodiment. As shown in FIG. 8, there is a significant power savings by simply waiting 10 seconds to enter the second non-operational power state. FIG. 5 exemplifies a predetermined period of time of 10 seconds. The increase in power at 10 seconds is due to waking up the backend to be able to flush the data from the volatile memory device to the non-volatile memory device.

In one embodiment, a data storage device comprises: at least one non-volatile memory device; at least one volatile memory device; a timer; and a controller coupled to the timer, the at least one non-volatile memory device, and the at least one volatile memory device. The controller is configured to: receive a request from a host device to enter into the lowest power state advertised to the host device; after a predetermined period of time, flush data from the at least one volatile memory device to the at least one non-volatile memory device, wherein the predetermined period of time is greater than 0.1 seconds; and cause the data storage device to enter the lowest power state advertised to the host device. The predetermined period of time is greater than 1 second. The predetermined period of time is between about 1 second and about 10 seconds. The data storage device does not advertise the predetermined period of time to the host device. After receiving the request and prior to completion of the predetermined period of time, the at least one volatile memory device remains in retention mode. The at least one volatile memory device comprises SRAM. The at least one non-volatile memory device comprises NAND. The controller is configured to reduce power to systems other than the at least one volatile memory device upon receiving the request.

In another embodiment, a data storage device comprises: at least one non-volatile memory device; and a controller coupled to the at least one non-volatile memory device, the controller configured to: present a power state descriptor table; and dynamically change the power state description table. The controller is configured to increase a maximum power. Idle power in unchanged while the controller increases the maximum power. The maximum power exceeds an advertised power limit presented to a host device. The maximum power is substantially equivalent to a transitional energy needed to transition between different substrates. Dynamically changing the power state description table is not advertised to a host device.

In another embodiment, a data storage device comprises: at least one non-volatile memory device; means to extend latency advertised to a host device; and means to perform a transition to a lower internal state after a predetermined period of time. The means to extend latency is configured to add 100 ms to 400 ms to the latency advertised to the host device. The data storage device further comprises at least one volatile memory device. The data storage device further comprises means to flush data from the at least one volatile memory device to the at least one non-volatile memory device. The data storage device further comprises means to calculate latency. The means to perform a transition to a lower internal state is coupled to the at least one non-volatile memory device.

By having an additional, unadvertised non-operational power state, power savings can occur. Additionally, because data is not immediately flushed to the non-volatile memory, the non-volatile memory endurance is increased relative to immediately flushing data to the non-volatile memory.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A data storage device, comprising:
   at least one non-volatile memory device;
   at least one volatile memory device;
   a timer; and
   a controller coupled to the timer, the at least one non-volatile memory device, and the at least one volatile memory device, the controller configured to:
      receive a request from a host device to enter into the lowest power state advertised to the host device;
      after a predetermined period of time, flush data from the at least one volatile memory device to the at least one non-volatile memory device, wherein the predetermined period of time is greater than 0.1 seconds; and
      cause the data storage device to enter the lowest power state advertised to the host device, wherein the controller is further configured not to advertise the predetermined period of time to the host device.

2. The data storage device of claim 1, wherein the predetermined period of time is greater than 1 second.

3. The data storage device of claim 1, wherein the predetermined period of time is between 1 second and 10 seconds.

4. The data storage device of claim 1, wherein after receiving the request and prior to completion of the predetermined period of time, the at least one volatile memory device is configured to remain in retention mode.

5. The data storage device of claim 1, wherein the at least one volatile memory device comprises SRAM.

6. The data storage device of claim 1, wherein the at least one non-volatile memory device comprises NAND.

7. A data storage device, comprising:
   at least one non-volatile memory device;
   at least one volatile memory device;
   a timer; and
   a controller coupled to the timer, the at least one non-volatile memory device, and the at least one volatile memory device, the controller configured to:
      receive a request from a host device to enter into the lowest power state advertised to the host device;
      after a predetermined period of time, flush data from the at least one volatile memory device to the at least one non-volatile memory device, wherein the predetermined period of time is greater than 0.1 seconds; and
      cause the data storage device to enter the lowest power state advertised to the host device, wherein the controller is further configured to reduce power to systems other than the at least one volatile memory device upon receiving the request.

8. That data storage device of claim 7, wherein the controller is further configured to cause the data storage device to enter the lowest power state advertised to the host device after the predetermined period of time.

9. A data storage device, comprising:
   at least one non-volatile memory device;
   at least one volatile memory device;
   a timer; and
   a controller coupled to the timer and the at least one non-volatile memory device, the controller configured to:
      present a power state descriptor table to a host device;
      receive a request from the host device to enter into a lowest power state presented to the host device;
      after a predetermined period of time, flush data from the at least one volatile memory device to the at least one non-volatile memory device, wherein the predetermined period of time is greater than 0.1 seconds;
      cause the data storage device to enter the lowest power state advertised to the host device after the predetermined period of time; and
      dynamically change the power state description table.

10. The data storage device of claim 9, wherein the controller is further configured to increase a maximum power.

11. The data storage device of claim 10, wherein idle power is unchanged while the controller increases the maximum power.

12. The data storage device of claim 9, wherein a maximum power exceeds an advertised power limit presented to the host device.

13. The data storage device of claim 12, wherein the maximum power is substantially equivalent to a transitional energy needed to transition between different states.

14. The data storage device of claim 9, wherein dynamically changing the power state description table is not advertised to the host device.

15. A data storage device, comprising:
non-volatile memory means;
volatile memory means; and
a controller coupled to the volatile memory means and the non-volatile memory means, wherein the controller is configured to:
 extend latency advertised to a host device;
 receive a request from the host device to enter into a lowest power state presented to the host device;
 after a predetermined period of time, flush data from the volatile memory means to the non-volatile memory means, wherein the predetermined period of time is greater than 0.1 seconds; and
 enter into the lowest power state advertised to the host device after the predetermined period of time.

16. The data storage device of claim 15, wherein extending latency advertised to the host device comprises adding 100 ms to 400 ms to the latency advertised to the host device.

17. The data storage device of claim 15, further comprising a timer.

18. The data storage device of claim 17, wherein the controller is further configured to set the timer to the predetermined period of time.

19. The data storage device of claim 15, wherein the controller is further configured to calculate latency.

20. The data storage device of claim 15, wherein the lowest advertised power state is a non-operational power state.

* * * * *